(12) United States Patent
Mitsui

(10) Patent No.: US 8,390,772 B2
(45) Date of Patent: Mar. 5, 2013

(54) LIQUID CRYSTAL DISPLAY DEVICE

(75) Inventor: Masashi Mitsui, Anpachi-gun (JP)

(73) Assignee: Sony Corporation, Tokyo (JP)

( * ) Notice: Subject to any disclaimer, the term of this patent is extended or adjusted under 35 U.S.C. 154(b) by 493 days.

(21) Appl. No.: 12/256,923

(22) Filed: Oct. 23, 2008

(65) Prior Publication Data

US 2009/0135354 A1    May 28, 2009

(30) Foreign Application Priority Data

Nov. 28, 2007  (JP) ................................ 2007-306939
Aug. 5, 2008   (JP) ................................ 2008-201553

(51) Int. Cl.
  *G02F 1/1335*  (2006.01)
  *G02F 1/1343*  (2006.01)

(52) U.S. Cl. ........................................ 349/114; 349/141
(58) Field of Classification Search .................. 349/114, 349/141
    See application file for complete search history.

(56) References Cited

U.S. PATENT DOCUMENTS

| | | | |
|---|---|---|---|
| 2002/0033923 A1* | 3/2002 | Shimoshikiryou et al. ... | 349/141 |
| 2003/0218664 A1* | 11/2003 | Sakamoto et al. ............ | 347/114 |
| 2007/0002226 A1* | 1/2007 | Sakamoto et al. ............ | 349/114 |
| 2007/0146591 A1* | 6/2007 | Kimura et al. ................ | 349/114 |

FOREIGN PATENT DOCUMENTS

| | | |
|---|---|---|
| JP | 2003-344837 | 12/2003 |
| JP | A 2003-344837 | 12/2003 |
| JP | 2005-257904 | 9/2005 |
| JP | A 2005-338256 | 12/2005 |
| JP | 2007-183585 | 7/2007 |

OTHER PUBLICATIONS

Office Action issued Oct. 16, 2012 for corresponding Japanese Patent Appln. No. 2008-201553.

* cited by examiner

*Primary Examiner* — Jessica M Merlin
(74) *Attorney, Agent, or Firm* — K&L Gates LLP

(57) ABSTRACT

A liquid crystal display device includes a first substrate, a second substrate, a liquid crystal layer arranged between the first substrate and the second substrate, a plurality of pixels each one of which has a tranmissive display portion for performing a tranmissive display operation and a reflective display portion for performing a reflective display operation, a first electrode provided in the first substrate, a second electrode provided in the first substrate and a third electrode provided in one of the first substrate and the second substrate. The first electrode is arranged both in the tranmissive display portion and in the reflective display portion. The second electrode is arranged in the tranmissive display portion. The first electrode and the second electrode are configured to control an alignment of liquid crystal molecules of the liquid crystal layer. At least one of the first electrode and the second electrode is provided with a plurality of slits formed to extend along a perpendicular axis that is perpendicular to an interface of the tranmissive display portion and the reflective display portion. The third electrode is arranged in the reflective display portion. The second electrode and the third electrode are configured to be provided with voltage independently.

10 Claims, 8 Drawing Sheets

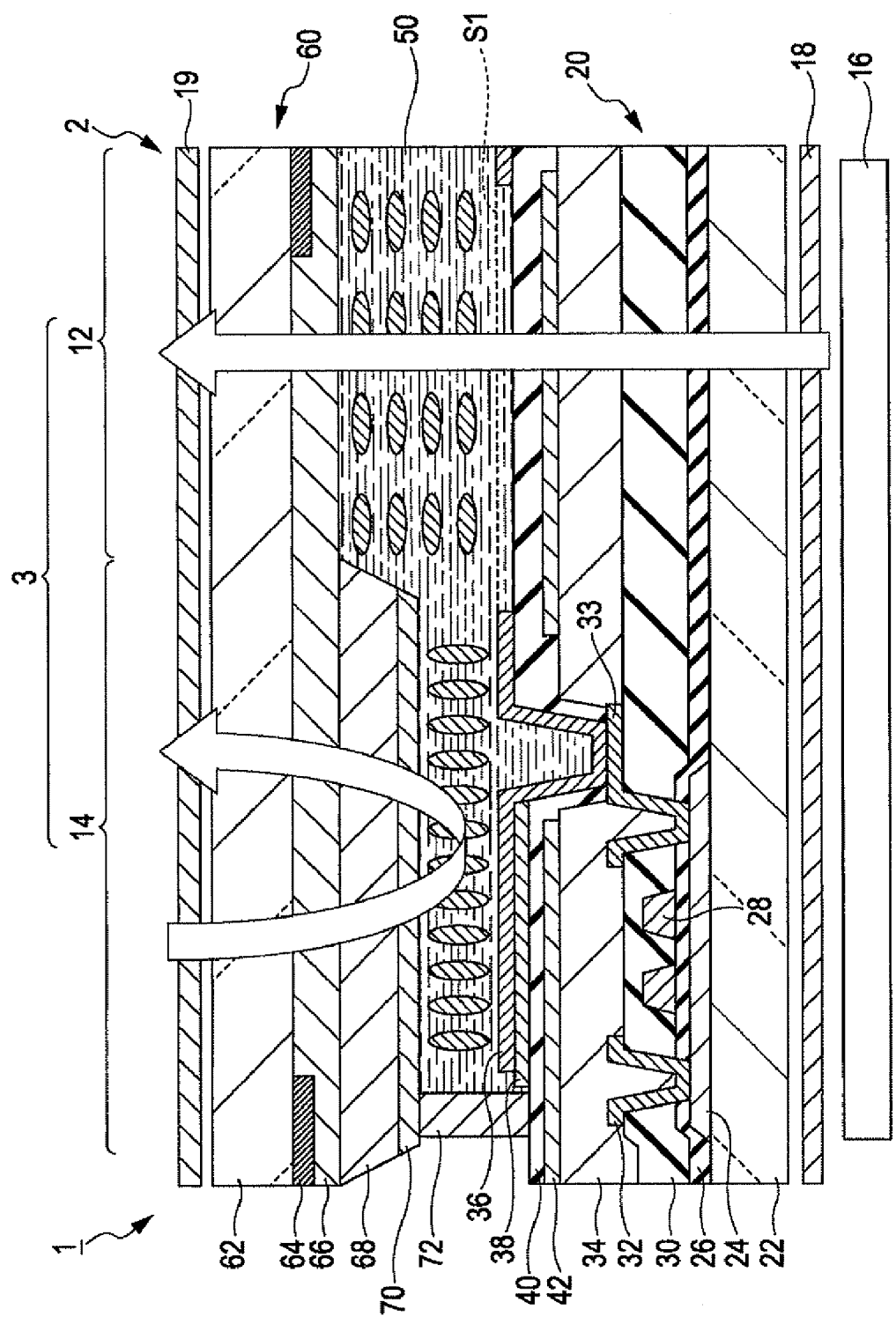

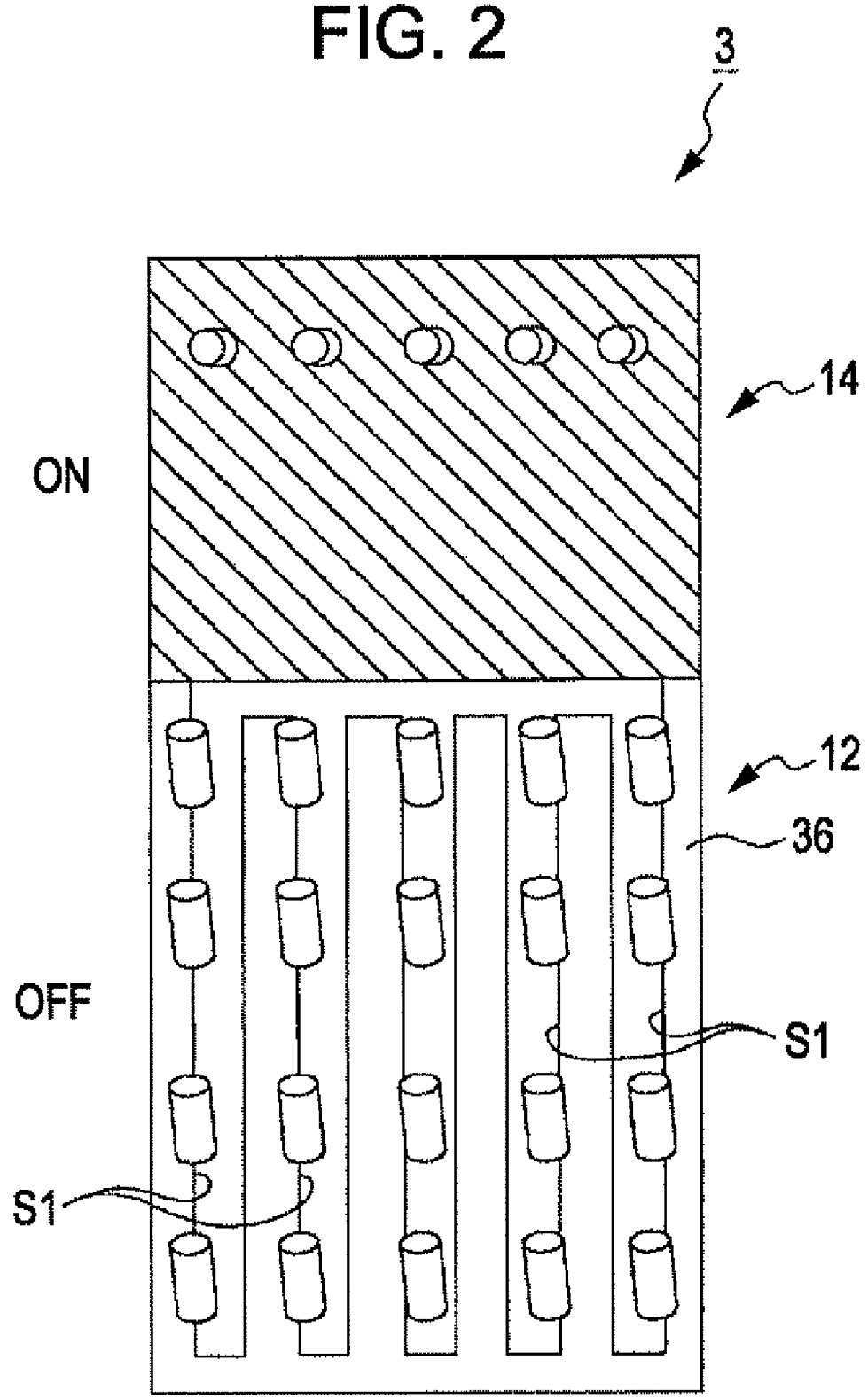

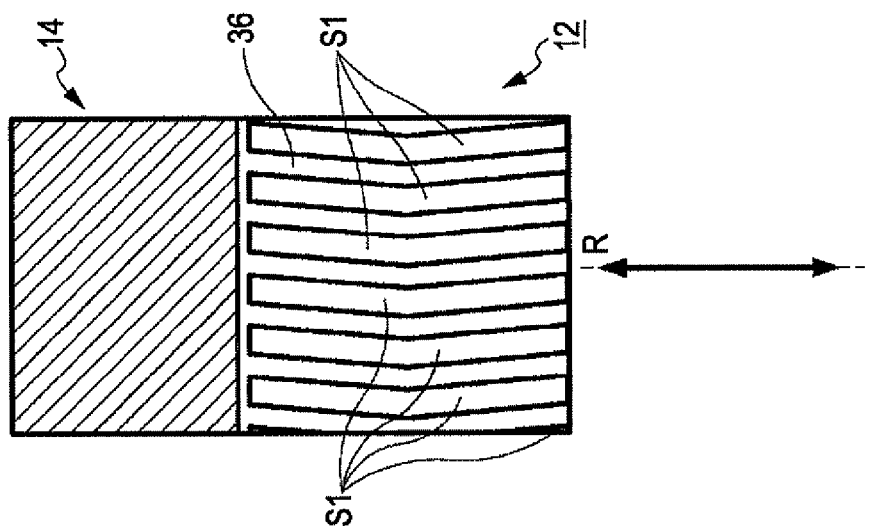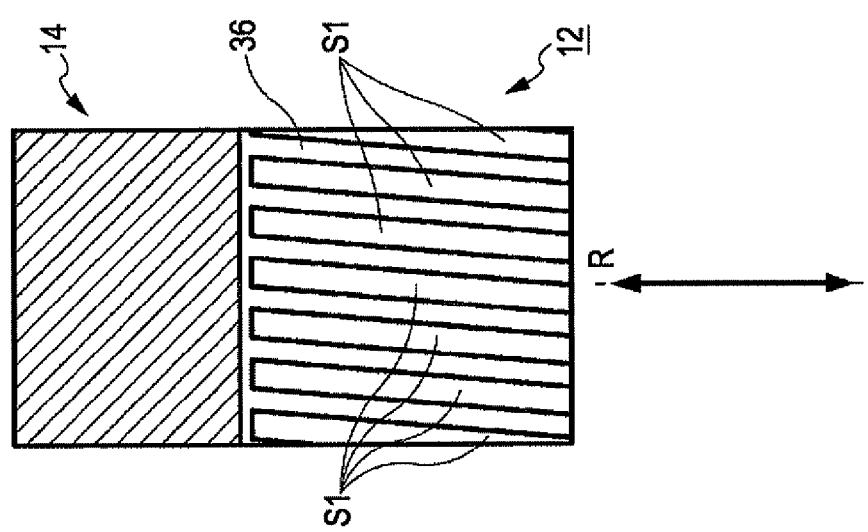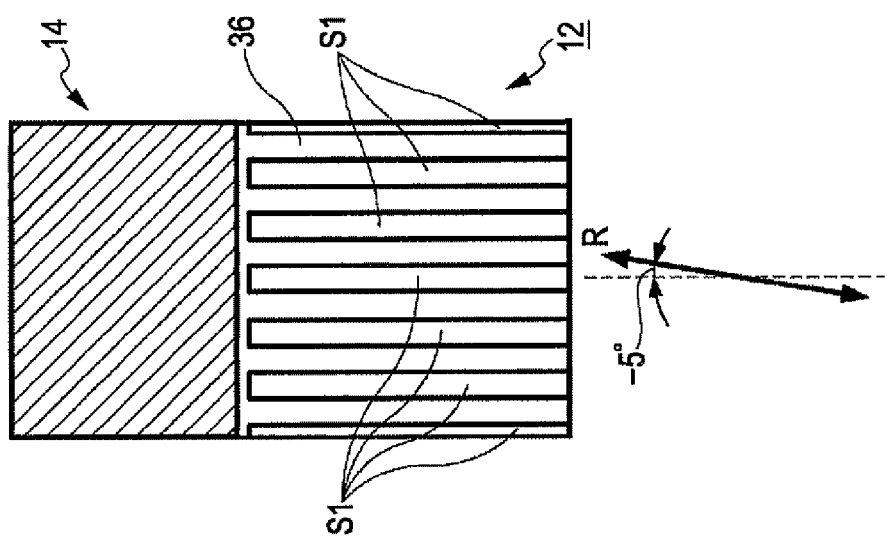

THE LIQUID CRYSTAL MOLECULES HAVE ROTATED OWING TO A LEAKED ELECTRIC FIELD.

LIGHT LEAKAGE OCCURS AROUND THE INTERFACE BETWEEN THE REFLECTIVE-TRANSMISSIVE PORTIONS.

LIQUID CRYSTAL DISPLAY DEVICE

BACKGROUND

1. Technical Field

The present invention relates to a liquid crystal display device having a transmissive display portion configured to perform a transmissive display operation and a reflective display portion configured to perform a reflective display operation in a pixel forming a display portion, wherein the transmissive display portion and the reflective display portion have a first substrate including a first electrode and a second electrode configured to control an alignment of liquid crystal molecules of a liquid crystal layer included inside the first and second electrodes.

2. Related Art

High visibility is required in various environments from outdoor to indoor for liquid crystal display devices to be used in mobile devices represented by personal digital assistants (PDAs), digital still cameras and digital video cameras. In recent years, in such a background, liquid crystal display devices of the so-called semi-transmissive type have attention, these devices having both a transmissive display portion and a reflective display portion in a sub-pixel.

Semi-transmissive liquid crystal display devices that have been generally used so far adopt a so-called vertical electric field driving method by which an electric field between a pixel electrode of an element substrate and an opposite electrode of an opposite substrate drives liquid crystal molecules. In a semi-transmissive liquid crystal display device having a transmissive display portion and a reflective display portion in a sub-pixel, a light path in the reflective display portion is twice as long as a light path in the transmissive display portion. Therefore, it is necessary to use half wavelength ($\lambda/2$) light modulation and quarter wavelength ($\lambda/4$) light modulation in a transmissive display mode and in a reflective display mode, respectively, which may be satisfied by different thicknesses (a cell gap) of the liquid crystal layer in the sub-pixel.

Higher visibility than usual may be expected by using semi-transmissive liquid crystal display devices adopting a so-called horizontal electric field driving method such as FFS (Fringe Field Switching) and IPS (In Plane Switching) which are well known for having wide view angles and high contrast. A problem has been pointed out, however, that the transmissive display portion and the reflective display portion are made normally black and normally white, respectively, by using the known configuration to arrange the cell gap and applying the horizontal electric field driving method.

For example, JP A-2005-338256 mentions that the reflective display portion is in a bright display state and the transmissive display portion is in a dark display state, or vice versa, if the semi-transmissive IPS method is simply used to apply a horizontal electric field to the liquid crystal layer. It is pointed out, according to JP A-2005-338256, that the reflective display portion and the transmissive display portion show dependency on applied voltages different from each other. It is disclosed, in order to solve this problem, that a built-in phase plate of retardation of a half wavelength is formed in the reflective display portion and the retardation of the liquid crystal layer of the reflective display portion is arranged to be a quarter wavelength.

It is pointed out, according to JP A-2003-344837, that a reflective region and a transmissive region are in normally white and normally black states, respectively, if a semi-transmissive liquid crystal display device is driven by a horizontal electric field. It is disclosed, in order to solve this problem, that a plate of a half wavelength is arranged between a lower substrate and a polarizing plate arranged on a side of the lower substrate.

As described above, the semi-transmissive liquid crystal display device of the so called horizontal electric field driving method has the problem that the transmissive display portion and the reflective display portion are in the normally black and normally white states, respectively. The methods of JP A2005-338256 and JP A-2003-344837 may be used in order to restore normal display states, i.e., to have both of the transmissive display portion and the reflective display portion in the normally black or normally white states. In that case, however, there are problems that the reflective display operation lacks sufficient reflectance and so on, although the transmissive display operation exhibits sufficient display performance, and that a configuration of a display panel is made complicated. In contrast, different methods of driving liquid crystal molecules may be separately applied to the transmissive display portion and the reflective display portion so as to have both of the transmissive display portion and the reflective display portion in the normally black or normally white state. In that case, however, there is a problem that the transmissive display portion suffers from light leakage around an interface to the reflective display portion and resultant low contrast.

SUMMARY

An advantage of some aspects of the invention is that a liquid crystal display device is provided to surely prevent light leakage from occurring in a transmissive display portion and to improve contrast.

According to a first aspect of the invention, a liquid crystal display device includes a first substrate, a second substrate, a liquid crystal layer arranged between the first substrate and the second substrate, a plurality of pixels each one of which has a tranmissive display portion for performing a tranmissive display operation and a reflective display portion for performing a reflective display operation, a first electrode provided in the first substrate, a second electrode provided in the first substrate and a third electrode provided in one of the first substrate and the second substrate. The first electrode is arranged both in the tranmissive display portion and in the reflective display portion. The second electrode is arranged in the tranmissive display portion. The first electrode and the second electrode are configured to control an alignment of liquid crystal molecules of the liquid crystal layer. At least one of the first electrode and the second electrode is provided with a plurality of slits formed to extend along a perpendicular axis that is perpendicular to an interface of the tranmissive display portion and the reflective display portion. The third electrode is arranged in the reflective display portion. The second electrode and the third electrode are configured to be provided with voltage independently.

According to the first aspect of the invention, the plural slits formed in one of the first electrode and the second electrode are formed along the perpendicular axis being perpendicular to the interface of the transmissive display portion and the reflective display portion, parallel or inclined at a given degree to the perpendicular axis. An initial alignment of the liquid crystal molecules may be arranged almost parallel to an extending direction of the slits. One of the first substrate and the second substrate includes the third electrode. While being arranged in the transmissive display portion with the second electrode, the first electrode is arranged in the reflective display portion with the third electrode. The second electrode and the third electrode may be provided with voltage independently. Thus, in a black display state where a voltage is applied between the first electrode and the second electrode in the transmissive display portion to generate an electric field and no voltage is applied between the first electrode and the third electrode in the reflective display portion, the initial alignment of the liquid crystal molecules of the liquid crystal layer of the transmissive display portion close to the reflective display portion never change due to the electric field generated in the reflective display portion. Light leakage may surely be prevented from occurring and contrast may be improved, thereby.

According to a second aspect of the invention, the slits of the liquid crystal display device according to the first aspect of the invention extend parallel or inclined at −15 to 15 degrees with respect to the perpendicular axis.

According to the second aspect of the invention, as the slits are arranged parallel or inclined at −15 to 15 degrees with respect to the perpendicular axis, rotating directions of the liquid crystal molecules of the liquid crystal layer along the slits may be made stable.

According to a third aspect of the invention, an initial alignment of the liquid crystal molecules of the liquid crystal display device according to the first or second aspect of the invention is arranged parallel or inclined at −15 to 15 degrees with respect to an extending direction of the slits, either clockwise or counterclockwise.

According to the third aspect of the invention, as the initial alignment of the liquid crystal molecules is arranged parallel or inclined at −15 to 15 degrees with respect to the extending direction of the slits, rotating directions of the liquid crystal molecules of the liquid crystal layer may be made stable. It is preferable to arrange the initial alignment of the liquid crystal molecules inclined at five degrees with respect to the extending direction of the slits so that rotating directions of the liquid crystal molecules are sure to be stable. As the extending direction of the slits and the initial alignment of the liquid crystal molecules are arranged closer, an abnormal display state caused by insufficient contact of rubbing cloth while rubbing operation, accompanying disturbance and so on may be more effectively suppressed.

According to a fourth aspect of the invention, the second electrode and the third electrode of the transmissive display portion and the reflective display portion of the liquid crystal display device according to the first aspect of the invention are a pair of common electrodes provided with voltage in an opposite phase.

According to the fourth aspect of the invention, as the second electrode and the third electrode of the transmissive display portion and the reflective display portion are the common electrodes configured to be provided with voltage in an opposite phase, the transmissive display portion and the reflective display portion may easily be in normally black or normally white states.

According to a fifth aspect of the invention, an insulating film is formed between the first electrode and the second electrode according to one of the first to fourth aspects of the invention, and the slits are formed in one of the first electrode and the second electrode arranged on a side of the liquid crystal layer. According to the fifth aspect of the invention, as the first electrode and the second electrode are layered through the insulating film and the slits are formed in one of the first electrode and the second electrode arranged on a side of the liquid crystal layer, a region where an alignment of the liquid crystal molecules of the liquid crystal layer may be controlled may increase and a transmittance may be improved.

According to a sixth aspect of the invention, the slits of the liquid crystal display device according to one of the first to fourth aspects of the invention are formed both in the first electrode and in the second electrode.

According to the sixth aspect of the invention, as the slits are formed both in the first electrode and in the second electrode, a horizontal electric field almost parallel to a surface of the first substrate may be applied to the liquid crystal molecules of the liquid crystal layer with a simpler configuration.

According to a seventh aspect of the invention, the third electrode of the liquid crystal display device according to one of the first to sixth aspect of the invention is formed in the second substrate.

According to the seventh aspect of the invention, as the third electrode is formed in the second substrate, a vertical electric field may be formed between the third electrode and the second electrode formed in the first substrate in a direction almost vertical to the surface of the first substrate.

According to an eighth aspect of the invention, the slits of the liquid crystal display device according to one of the first to seventh aspect of the invention are arranged only in the transmissive display portion.

According to the eighth aspect of the invention, as the slits are arranged only in the transmissive display portion, a display mode of the horizontal electric field featuring a wide view angle may be applied to the transmissive display portion and another display mode proper to the reflective display operation may be applied to the reflective display portion.

BRIEF DESCRIPTION OF THE DRAWINGS

The invention will be described with reference to the accompanying drawings, wherein like numbers reference like elements.

FIG. 1 is a cross section of an embodiment of the invention applied to a semi-transmissive liquid crystal display device.

FIG. 2 is a plan view of a pixel model of the embodiment.

FIG. 3A is a plan view of a pixel model of the embodiment including slits which are arranged parallel to a perpendicular axis perpendicular to an interface of a transmissive display portion and a reflective display portion.

FIGS. 3B and 3C are plan views of pixel models of the embodiment including slits which are arranged inclined to the perpendicular axis perpendicular to the interface.

DESCRIPTION OF EXEMPLARY EMBODIMENTS

Figure 4A:
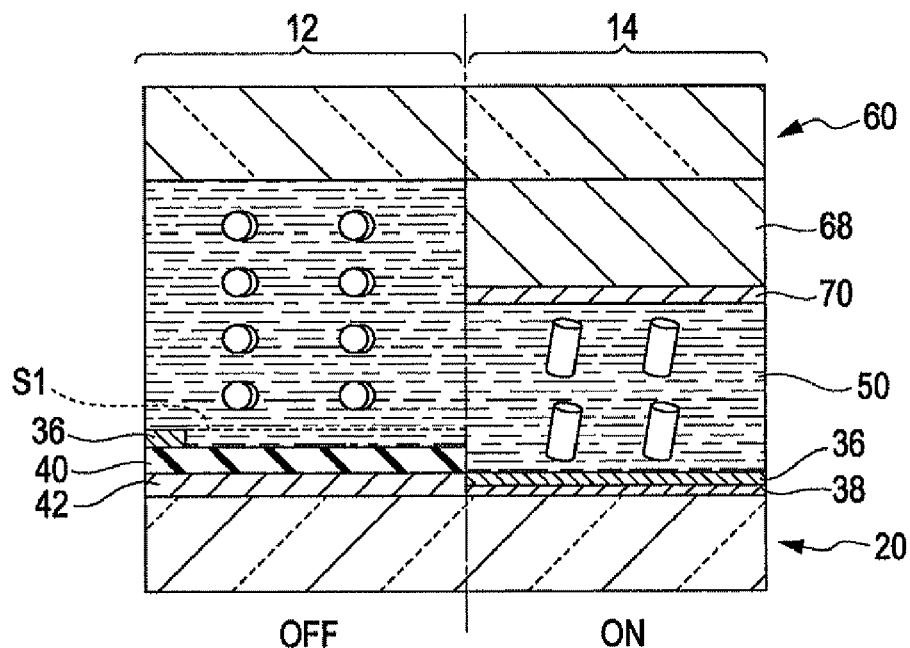
FIGS. 4A and 4B are diagrams explaining a pixel driving model of the embodiment in a black display state and in a white display state, respectively.

An embodiment of the invention will be described in the following paragraphs referring to the drawings. FIG. 1 is a cross-sectional view of a liquid crystal display device according to the embodiment of the invention. In FIG. 1, the device given a reference numeral 1 is a liquid crystal display device of a semi-transmissive type having a number of pixels, each one of which is a pixel 3, forming a display portion 2. The pixel 3 includes a transmissive display portion 12 and a reflective display portion 14. The transmissive display portion 12 is configured to perform a transmissive display operation by using the FFS method. The reflective display portion 14 is configured to perform a reflective display operation by using an electronically controlled birefringence (ECB) method.

As shown in FIG. 1, e.g., the semi-transmissive liquid crystal display device 1 includes a backlight 16, an element substrate 20, i.e., a first substrate having transparency, and an opposite substrate 60, i.e., a second substrate having transparency and facing the element substrate 20 through a liquid crystal layer 50. The semi-transmissive liquid crystal display device 1 includes an element-substrate-side polarizing plate 18 arranged between the backlight 16 and the element substrate 20, and an opposite-substrate-side polarizing plate 19 arranged outside the opposite substrate 60.

The element substrate 20 corresponds to a first substrate. The opposite substrate 60 corresponds to a second substrate.

The opposite substrate 60 is on a side facing a user of the semi-transmissive liquid crystal display device 1, i.e., the user may view brightness depending on the optical characteristics of the liquid crystal layer 50 from the side of the opposite substrate 60.

In the transmissive display portion 12, then, light emitted by the backlight 16 passes the element-substrate-side polarizing plate 18, the element substrate 20, the liquid crystal layer 50, the opposite substrate 60 and the opposite-substrate-side polarizing plate 19, and reaches an eye of the user.

In the reflective display portion 14, incoming external light passes the opposite-substrate-side polarizing plate 19 and the opposite substrate 60, and reaches the liquid crystal layer 50. The external light is then reflected by a reflective plate 38 formed on an upper face of the element substrate 20, again passes the liquid crystal layer 50, the opposite substrate 60 and the opposite-substrate-side polarizing plate 19, and then reaches the eye of the user.

The opposite substrate 60 is formed by several films layered on top of each other. As shown in FIG. 1, e.g., the opposite substrate 60 is formed by including, from the opposite-substrate-side polarizing plate 19 to the element substrate 20, a glass substrate 62, a black matrix 64, a color filter 66, a reflective region gap arrangement layer 68, a reflective display common electrode 70 being a common electrode in the reflective display portion 14, and a spacer 72. These members may be sized and formed by using well-known methods for making ordinary liquid crystal display devices of active matrix types, and their detailed explanation will be omitted.

The reflective display common electrode 70 corresponds to a third electrode.

The reflective region gap arrangement layer 68 is provided so that a half wavelength ($\lambda/2$) light modulation and a quarter wavelength ($\lambda/4$) light modulation are used for a transmissive display mode and a reflective display mode, respectively, as a light path in the reflective display portion 14 is twice as long as a light path in the transmissive display portion 12. As the reflective region gap arrangement layer 68 is provided in this manner, the liquid crystal layer 50 in the reflective display portion 14 is not as thick as in the transmissive display portion 12. The thickness of the liquid crystal layer 50 is set on the basis of the thickness of the reflective region gap arrangement layer 68 in such a way that retardation value of the liquid crystal layer 50 is approximately $\Delta nd=\lambda/4$ and $\Delta nd=\lambda/2$ in the reflective display portion 14 and in the transmissive display portion 12, respectively. The reflective region gap arrangement layer 68 may have a function of a quarter wavelength plate, or may function as a so-called built-in retardation layer.

The element substrate 20, which may be called an element sided substrate or a thin film transistor (TFT) substrate, is a substrate located on a side where switching elements are arranged. The element substrate 20 faces the opposite substrate 60. On the upper face of the element substrate 20, plural films are layered in a pattern of a multi-layer structure by using well-known methods for forming films and forming patterns.

As shown in FIG. 1, e.g., from the side of the backlight 16 to the side of the liquid crystal layer 50, a glass substrate 22, a semiconductor layer 24, a gate insulating film 26, a gate electrode 28, an interlayer insulating film 30, source/drain electrodes 32, 33, a planarization film 34, a common electrode 42, an FFS insulating film 40, the reflecting plate 38 and a pixel electrode 36 are layered and formed in sequence. These members may be sized and formed according to well-known methods for making liquid crystal display devices of the ordinary active matrix type, and their detailed explanation will be omitted.

The pixel electrode 36 corresponds to a first electrode. The common electrode 42 corresponds to a second electrode.

Some of the above members are related to the FFS method in the transmissive display portion 12, which are the common electrode 42 formed on an upper face of the planarization film 34, and the pixel electrode 36 arranged on an upper face of the common electrode 42 through the FFS insulating film 40. The common electrode 42 and the pixel electrode 36 are formed from a transparent conductive material such as indium tin oxide (ITO).

In the pixel electrode 36 arranged near the liquid crystal layer 50, as shown by a model in FIG. 2, plural slits are formed, each one of which is a slit S1 and extends parallel or slightly inclined at −15 to 15 degrees with respect to a perpendicular axis that is perpendicular to an interface between the transmissive display portion 12 and the reflective display portion 14.

Liquid crystal molecules of the liquid crystal layer 50 are arranged in such a way as to be aligned in the direction of a rubbing axis R, as the pixel electrode 36 has a plurality of slits S1 parallel or slightly inclined at −15 to 15 degrees with respect to the interface between the transmissive display portion 12 and the reflective display portion 14, and that an initial alignment of the liquid crystal molecules is arranged parallel or slightly inclined with respect to the perpendicular axis.

As described above, due to the initial alignment of the liquid crystal molecules arranged to be inclined at −15 to 15 degrees, the liquid crystal molecules of the liquid crystal layer 50 may be made stable in the rotating directions. It is preferable to arrange the initial alignment of the liquid crystal molecules in the extending direction of the slits S1 at five degrees so that the liquid crystal molecules are sure to be stable in the rotating directions.

FIG. 3A shows a case where the slits S1 is arranged parallel to the perpendicular axis perpendicular to the interface. FIG. 3B shows a case where the slits S1 are inclined at five degrees with respect to the perpendicular axis perpendicular to the interface. FIG. 3C shows a case where the slits S1 are bent at a central portion of the transmissive display portion 12 and formed by two portions inclined at five and minus five degrees with respect to the perpendicular axis perpendicular to the interface. The rubbing axis R, i.e., the initial alignment of the liquid crystal molecules, is arranged inclined at minus five degrees with respect to the perpendicular axis perpendicular to the interface in FIG. 3A, and parallel to the perpendicular axis perpendicular to the interface in FIG. 3B and FIG. 3C. In FIG. 2 and FIG. 3C, a short side of the slits S1 being farther from the interface is shaped so as to be closed. In FIG. 3A and FIG. 3B, the short side of the slits S1 being farther from the interface is shaped so as to be open. If the slits S1 is formed in the pixel electrode 36, the shape shown in FIG. 3A may have a better aperture ratio rather than the shape shown in FIG. 2.

Then, the slits S1 of the pixel electrode 36 may apply an electric field between the common electrode 42 and the pixel electrode 36, and the electric field may drive the liquid crystal layer 50 on the basis of the horizontal electric field driving method. Meanwhile, the reflective display portion 14 may be driven, on the basis of the vertical electric field driving method, by members including the common electrode 42 formed on the upper face of the planarization film 34 and the pixel electrode 36 arranged on the upper face of the common electrode 42 through the FFS insulating film 40. The reflective display portion 14 is different from the transmissive display portion 12 in that the pixel electrode 36 needs no slits, the element substrate 20 has the reflecting plate 38, and the opposite substrate 60 has the reflective region gap arrangement layer 68 and the reflective display common electrode 70.

The reflecting plate 38 is a reflecting film configured to reflect light coming from the side of the opposite substrate 60 back to the side of the opposite substrate 60. The reflecting plate 38 may be a conductive film electrically connected to the pixel electrode 36. The common electrode 42 and the pixel electrode 36 are configured to hold capacitance for driving the liquid crystal layer 50 through the FFS insulating film 40 arranged between the common electrode 42 and the pixel electrode 36. The reflecting display portion 14 may or may not have a common electrode formed below the FFS insulating film 40.

Although not shown in FIG. 1, an aligned film is provided on faces of the element substrate 20 and the opposite substrate 60 that are in contact with the liquid crystal layer 50.

Then, operation of the embodiment described above will be explained. At first, a relation between polarizing axes of the polarizing plates and the alignment of the liquid crystal molecules is given as described below.

That is, the two polarizing plates outside the glass substrates 22, 62, which are the element-substrate-side polarizing plate 18 and the opposite-substrate-side polarizing plate 19, are arranged in such a way that the polarizing axes are aligned perpendicular to each other, and that the polarizing axis of either one is aligned almost parallel to the alignment axis of the liquid crystal molecules at the time the driving voltage applied to the liquid crystal layer 50 is turned off.

Meanwhile, the reflective display portion 14 is configured in such a way that the liquid crystal molecules rise vertically to the surfaces of the glass substrates 22, 62 at the time the driving voltage is turned on.

In the above configuration and at the time the driving voltage is turned off, light emitted by the backlight 16 and incident on the transmissive display portion 12 passes the element-substrate-side polarizing plate 18 and is linearly polarized. After passing the liquid crystal layer 50, the light may not pass the opposite-substrate-side polarizing plate 19 and is absorbed to provide a black display state (normally black). Meanwhile, the thickness of the liquid crystal layer 50 of the transmissive display portion 12 has been set in such a way that the retardation value $\Delta nd$ is approximately $\lambda/2$, as previously explained. Thus, if the driving voltage is turned on, the linearly polarized light incident on the transmissive display portion 12 produces a retardation value while passing the liquid crystal layer 50, penetrates the opposite-substrate-side polarizing plate 19 and provides a white display state (normally white).

Meanwhile, the reflective display portion 14 in which the thickness of the liquid crystal layer 50 has been set in such a way that the retardation value $\Delta nd$ is approximately $\lambda/4$ may work as described below. Light incident on the reflective display portion 14 passes the opposite-substrate-side polarizing plate 19 and is linearly polarized. If the driving voltage is turned off, the linearly polarized produces a retardation value of $\lambda/4$ while passing the liquid crystal layer 50, and is clockwise circularly polarized. Having been reflected by the reflecting plate 38, the light is then counterclockwise circularly polarized, passes through the liquid crystal layer 50 again and is linearly polarized and rotated by 90 degrees, passes through the opposite-substrate-side polarizing plate 19 and provides the white display state (normally white).

Figure 4B:
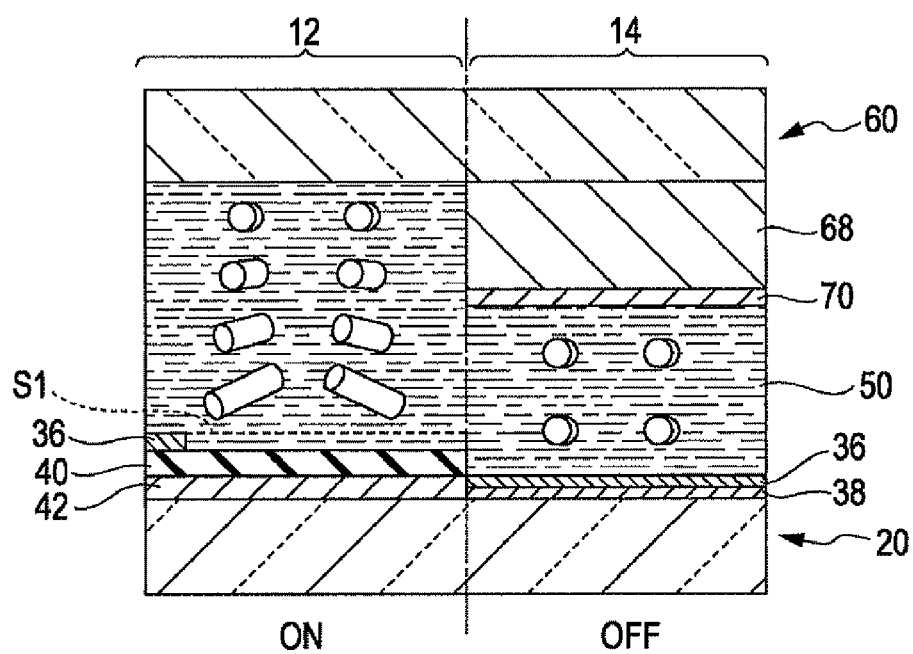

As shown by a model in FIG. 4A, thus, the driving voltages applied to the transmissive display portion 12 and to the reflective display portion 14 may be turned off and on, respectively, so that the pixel 3 is in the black display state. As shown by a model in FIG. 4B, conversely, the driving voltages applied to the transmissive display portion 12 and to the reflective display portion 14 may be turned on and off, respectively, so that the pixel 3 is in the white display state. For example, the same display signal voltage may be applied to the transmissive display portion 12 and to the reflective display portion 14 of the pixel electrode 36 and voltages in an opposite phase may be applied to the common electrode 42 and to the reflective display common electrode 70, so that the transmissive display portion 12 and the reflective display portion 14 are both in the normally black state or in the normally white state.

In the display control condition described above, one of the voltages applied to the transmissive display portion 12 and the reflective display portion 14, the transmissive display portion 12 and the reflective display portion 14 being adjacent to each other, is turned on, and the other is turned off. Thus, if the driving voltages applied to the transmissive display portion 12 and the reflective display portion 14 are turned off and on, respectively, so that the pixel 3 is in the black display state, an electric field generated by the driving voltage applied to the reflective display common electrode 70 and leaking to the transmissive display portion 12 through the interface of the reflective display portion 14 and the transmissive display portion 12 may affect the transmissive display portion 12 as a leaked electric field.

At this moment, as shown in FIG. 2, the initial alignment of the liquid crystal molecules of the liquid crystal layer 50 is set in such a way that longer axes of the liquid crystal molecules are inclined at a small angle $\theta 1$ (five to 15 degrees) to the perpendicular axis that is perpendicular to the interface between the transmissive display portion 12 and the reflective display portion 14. Even if affected by the electric field leaked from the reflective display portion 14, the alignment of the liquid crystal molecules hardly changes thereby. Light leakage that could be caused according to the related art by a change of the alignment of the liquid crystal molecules at the interface of the transmissive display portion 12 and the reflective display portion 14 may surely be prevented from occurring. Contrast degradation caused by the light leakage may surely be prevented from occurring.

Figure 5:
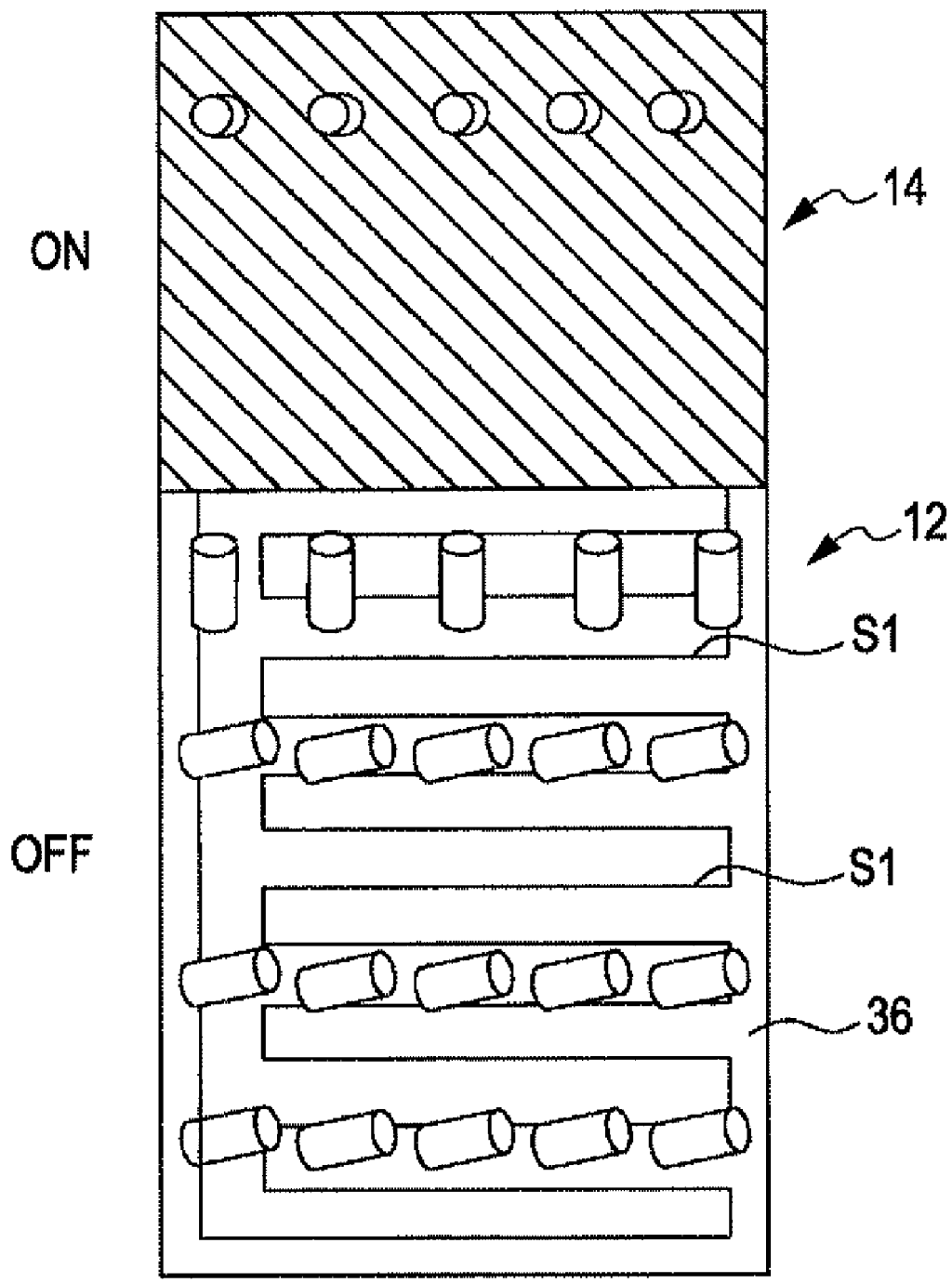
FIG. 5 is a plan view of a pixel model of related art.

Incidentally, as shown in FIG. 5 of the related art, the slits S1 of the pixel electrode 36 of the transmissive display portion 12 is formed parallel to the interface between the transmissive display portion 12 and the reflective display portion 14. The rubbing axis is arranged in such a way that the alignment of the liquid crystal molecules of the liquid crystal layer 50 is slightly inclined with respect to the slits S1.

Thus, if the driving voltages applied to the transmissive display portion 12 and to the reflective display portion 14 are turned off and on, respectively, so that the pixel 3 is in the black display state, an electric field generated by the driving voltage applied to the reflective display common electrode 70 of the reflective display portion 14 may leak to the transmissive display portion 12.

The leaked electric field makes the liquid crystal molecules of the transmissive display portion 12 close to the reflective display portion 14 rotate from the initial alignment state where the long axes are directed parallel to the slits to a direction in which the long axes are perpendicular to the slits S1.

The rotation of the long axes of the liquid crystal molecules may cause a light leakage phenomenon, i.e., the light in the reflective display portion 14 leaks to a side of the transmissive display portion 12 close to the reflective display portion 14. The light leakage phenomenon may degrade the contrast of the pixel 3.

Figure 6:
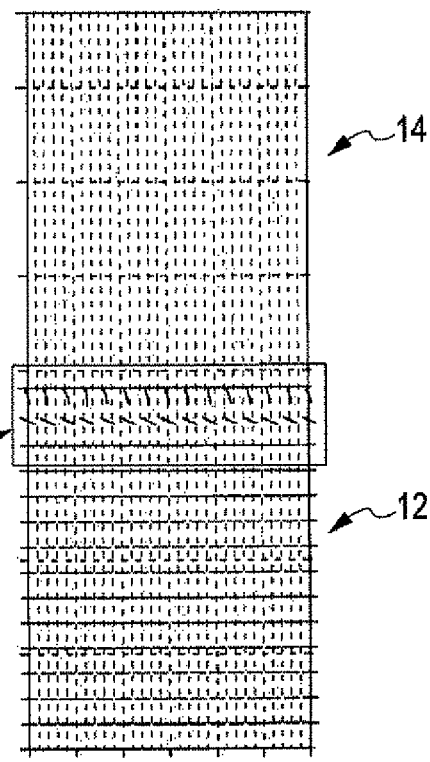
FIG. 6 is a diagram explaining a simulation result of a black display state of the pixel of related art.

FIG. 6 shows a result of a simulation actually performed in a configuration of the related art. As clearly shown in FIG. 6, the liquid crystal molecules of the transmissive display portion 12 close to the reflective display portion 14 have rotated from the initial alignment state. As a result, as shown in FIG. 7, a light leakage portion 80 may be observed around the interface of the transmissive display portion 12 and the reflective display portion 14, and the contrast of the pixel 3 has been degraded.

Meanwhile, according to the configuration of the embodiment as described earlier, the slits S1 is directed along the perpendicular axis that is perpendicular to the interface of the transmissive display portion 12 and the reflective display portion 14, and the initial alignment of the liquid crystal molecules of the liquid crystal layer 50 is accordingly directed along the slits S1, i.e., along the perpendicular axis.

Figure 7:
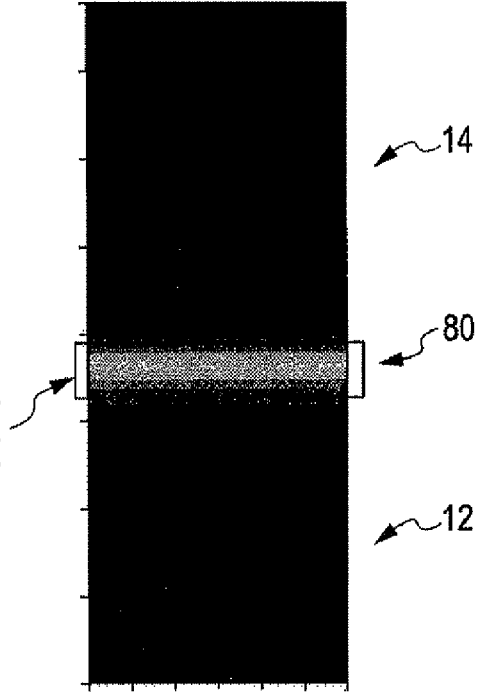
FIG. 7 is a diagram explaining a simulation result of a light leakage state of the pixel of related art.
Figure 8:
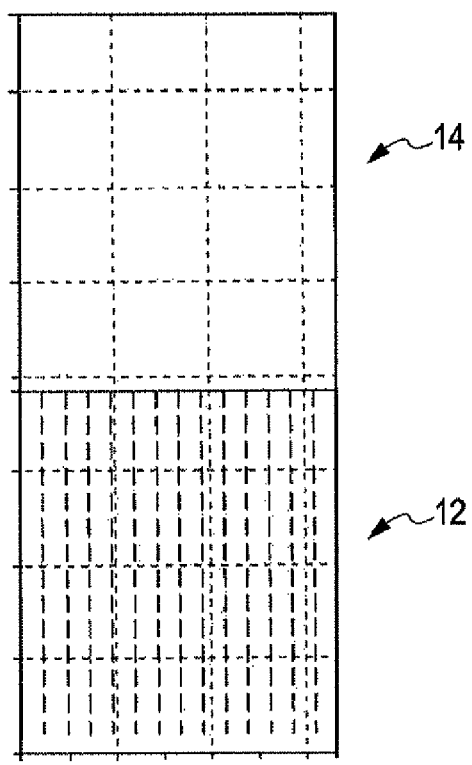
FIG. 8 is a diagram explaining a simulation result of a black display state of the pixel of the invention.
Figure 9:
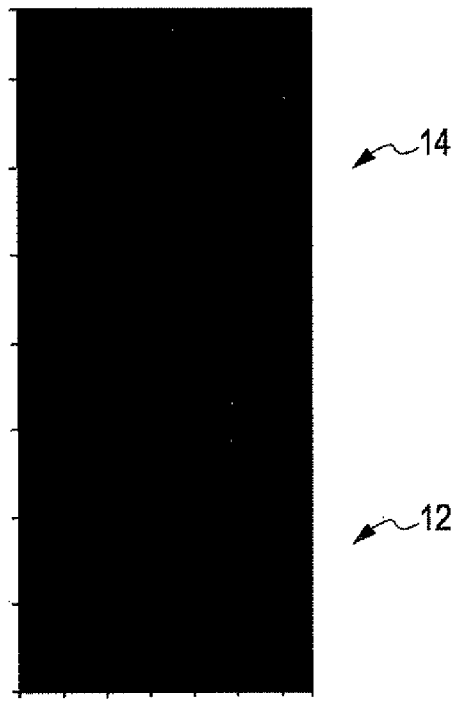
FIG. 9 is a diagram explaining a simulation result of a light leakage state of the pixel of the invention.

Therefore, as a result of a simulation performed under the condition that the pixel 3 is similarly in the black display state, although a leaked electric field generated by the driving voltage applied to the reflective display portion 14 affects the liquid crystal molecules in a region of the transmissive display portion 12 close to the reflective display portion 14 as shown in FIG. 7, the alignment of the liquid crystal molecules hardly changes as shown in FIG. 8. As the liquid crystal molecules maintain a state of absorbing transmissive light, the light does not leak through the interface of the transmissive display portion 12 and the reflective display portion 14 so that a black display state of high contrast may be obtained.

As the transmissive display portion 12 and the reflective display portion 14 of the pixel 3 are arranged in sequence and repetitively to form the display portion 2, the transmissive display portion 12 is arranged close to a reflective display portion 14 of an adjacent pixel. Thus, the transmissive display portion 12 may be affected by a leaked electric field caused by the reflective display portion 14 of the adjacent pixel. According to the embodiment though, as described above, as the longer axes of the liquid crystal molecules are also aligned toward the reflective display portion 14 of the adjacent pixel in the initial alignment state, the transmissive display portion 12 may be hardly affected by the leaked electric field of the reflective display portion 14 of the adjacent pixel so that light leakage may surely be prevented from occurring.

As described above, the rubbing axis is aligned in such a way that the alignment of the liquid crystal molecules of the liquid crystal layer 50 is inclined at five to 15 degrees with respect to the extending direction of the slits S1 of the pixel electrode 36. The direction of the rubbing axis is not limited to the above and may be consistent with the extending direction of the slits S1. In this case, as the extending direction of the slits S1 agrees with the initial alignment of the liquid crystal molecules, an abnormal display state caused by insufficient contact of rubbing cloth used in a rubbing operation, accompanying disturbance and so on may be suppressed.

Figure 10:
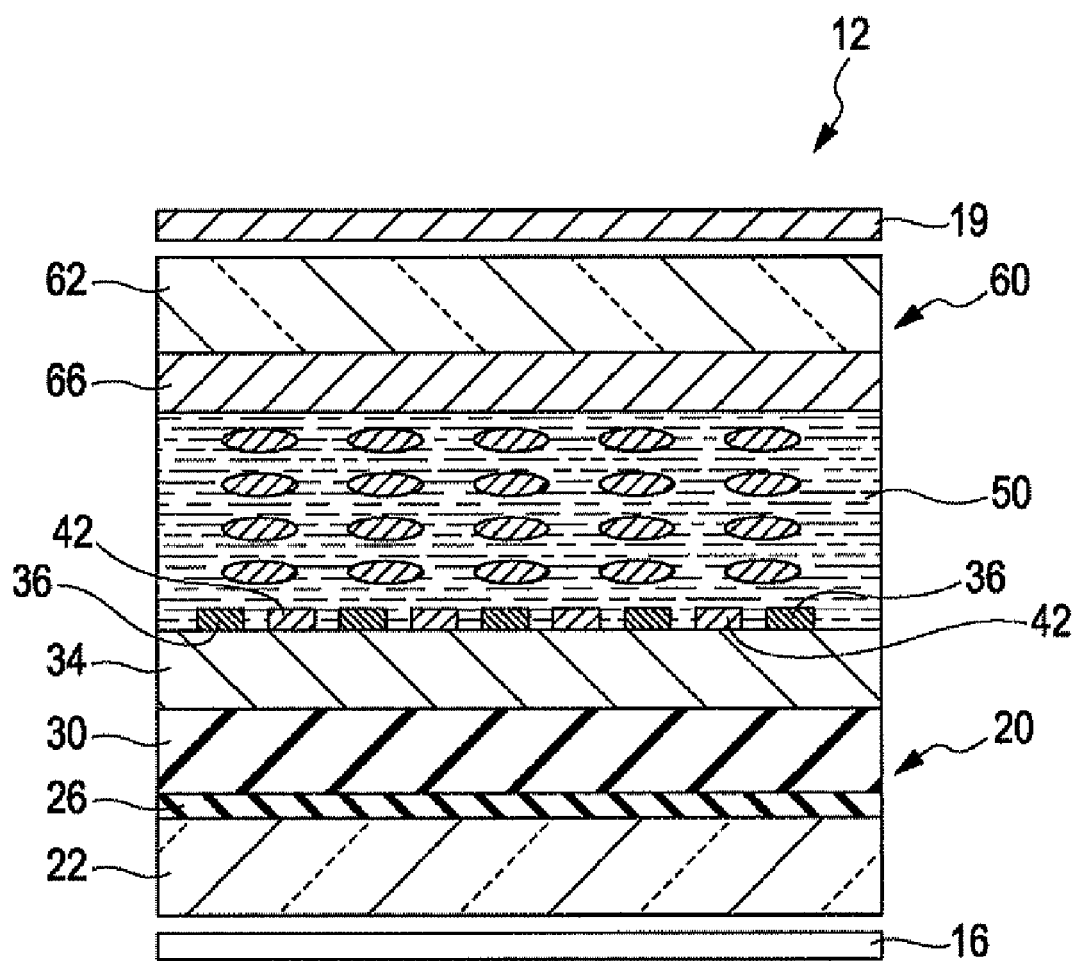
FIG. 10 is a cross section of a transmissive display portion of another embodiment of the invention in a direction perpendicular to the slits.

As described above, the slits S1 of the embodiment are formed on the pixel electrode 36. In a case where the common electrode 42 is arranged on a side of the liquid crystal molecules though, the slits S1 are not limited to the above and may be formed on the common electrode 42 instead. As described above, the pixel electrode 36 and the common electrode 42 of the embodiment are arranged through the FFS insulating film 40 and the electrode on the side of the liquid crystal layer 50 has the slits S1. The transmissive display portion 12 is not limited to the above and may be configured as shown in FIG. 10, i.e., a cross section in a direction perpendicular to the slits S1. As shown in FIG. 10, both of the pixel electrode 36 and the common electrode 42 may have the slits S1 and may be formed on the planarization film 34 in a same layer without the FFS insulating film 40, and the electrode of the one may be arranged on the slits S1 of the other. As described above, the reflective display common electrode 70 is formed on the opposite substrate 60. The reflective display common electrode 70 is not limited to the above and may be formed on the element substrate 20.

As described above, the pixel 3 may work in the FFS mode of the normally black type. The invention is not limited to the above and may be applied to a liquid crystal display device that may work in an FFS mode of the normally white type. In this case, it is sufficient that a relation among transmissive axes of the element-substrate-side polarizing plate 18 and the opposite-substrate-side polarizing plate 19, and a rubbing direction of an aligned film (not shown) is modified so as to meet the requirement of the normally white type mode.

What is claimed is:

1. A liquid crystal display device, comprising:
a first substrate;
a second substrate;
a liquid crystal layer arranged between the first substrate and the second substrate;
a plurality of pixels each one of which has a transmissive display portion for performing a transmissive display operation and a reflective display portion for performing a reflective display operation;
a first electrode provided in the first substrate, the first electrode arranged both in the transmissive display portion and in the reflective display portion;
a second electrode provided in the first substrate, the second electrode arranged in the transmissive display portion, the first electrode and the second electrode configured to control an alignment of liquid crystal molecules of the liquid crystal layer, at least one of the first electrode and the second electrode provided with a plurality of slits formed to extend along a perpendicular axis that is perpendicular to an interface of the transmissive display portion and the reflective display portion;
an insulating film formed on the second electrode;
a reflecting plate formed on the insulating film and positioned between the first electrode and the second electrode, the reflecting film being a conductive film that is electrically connected to the first electrode; and
a third electrode formed in the second substrate, the third electrode arranged in the reflective display portion, the second electrode and the third electrode configured to be provided with voltage independently,
wherein the transmissive display portion is driven by a first driving method, and the reflective display portion is driven by a second driving method that is different from the first driving method, and wherein the first electrode and the second electrode are configured to hold capacitance.

2. The liquid crystal display device according to claim 1, wherein the slits extend parallel or inclined at −15 to 15 degrees with respect to the perpendicular axis.

3. The liquid crystal display device according to claim 1, wherein an initial alignment of the liquid crystal molecules is arranged parallel or inclined at −15 to 15 degrees with respect to an extending direction of the slits.

4. The liquid crystal display device according to claim 1, wherein the second electrode and the third electrode of the transmissive display portion and the reflective display portion are a pair of common electrodes provided with voltages in opposite phases.

5. The liquid crystal display device according to claim 1, wherein an the slits are formed in one of the first electrode and the second electrode arranged on a side of the liquid crystal layer.

6. The liquid crystal display device according to claim 1, wherein the slits are formed both in the first electrode and the second electrode.

7. The liquid crystal display device according to claim 1, wherein the slits are arranged only in the transmissive display portion.

8. The liquid crystal display device according to claim 1, wherein the first electrode is arranged on a face of the second electrode facing the liquid crystal layer.

9. The liquid crystal display device according to claim 1, wherein the first driving method is a fringe field switching (FFS) method, and the second driving method is an electronically controlled birefringence (ECB) method.

10. The liquid crystal display device according to claim 1, wherein the second electrode is arranged only in the transmissive display portion, and the third electrode is arranged only in the reflective display portion.

* * * * *